United States Patent [19]

Williams et al.

[11] 4,074,856

[45] Feb. 21, 1978

[54] GREENHOUSE WATERING APPARATUS

[75] Inventors: David Williams; Brian A. Lentz; Harold E. Le Veque, all of Salinas, Calif.

[73] Assignee: Union Carbide Corporation, New York, N.Y.

[21] Appl. No.: 712,075

[22] Filed: Aug. 5, 1976

[51] Int. Cl.² .............................................. B05B 3/18
[52] U.S. Cl. ...................................... 239/1; 239/185; 239/197; 239/208
[58] Field of Search ................. 239/185, 189, 195–197, 239/208, 1

[56]      References Cited
       U.S. PATENT DOCUMENTS

| | | | |
|---|---|---|---|
| 2,931,579 | 4/1960 | Ruddell | 239/195 X |
| 3,295,763 | 1/1967 | Brauner | 239/185 X |
| 3,942,722 | 3/1976 | Ede | 239/189 X |

Primary Examiner—Robert W. Saifer
Attorney, Agent, or Firm—Owen, Wickersham & Erickson

[57] ABSTRACT

This greenhouse watering apparatus has a horizontal support member running centrally for the length of the greenhouse, suspended from above, as from the roof of the greenhouse. A carriage depends from the support member and has trolley wheels rolling along two opposite upper surface portions of the support member in such a way that the suspension of the support member does not interfere with back-and-forth movement of the carriage. A drive wheel moves the carriage along the support member, while a rotary hose reel supported by the carriage reels in or unreels a flexible hose as required. The hose is maximally reeled when the carriage is midway between the ends of the support member and is minimally reeled when the carriage is at either end. During reeling the reel is driven by a slip clutch, which slips during unreeling. A pair of booms, one on each side of the reel, extend out hroizontally, perpendicular to the support member, and each boom is provided with a series of spray nozzles. The hose supplies water to a central inlet pipe associated with the reel and from there through a rotary coupling to the booms and nozzles. Water may be conducted alternately to the nozzles of one boom and then to those of the other as the carriage travels in one direction and the opposite direction, in order to avoid overwatering at the ends of the greenhouse.

39 Claims, 13 Drawing Figures

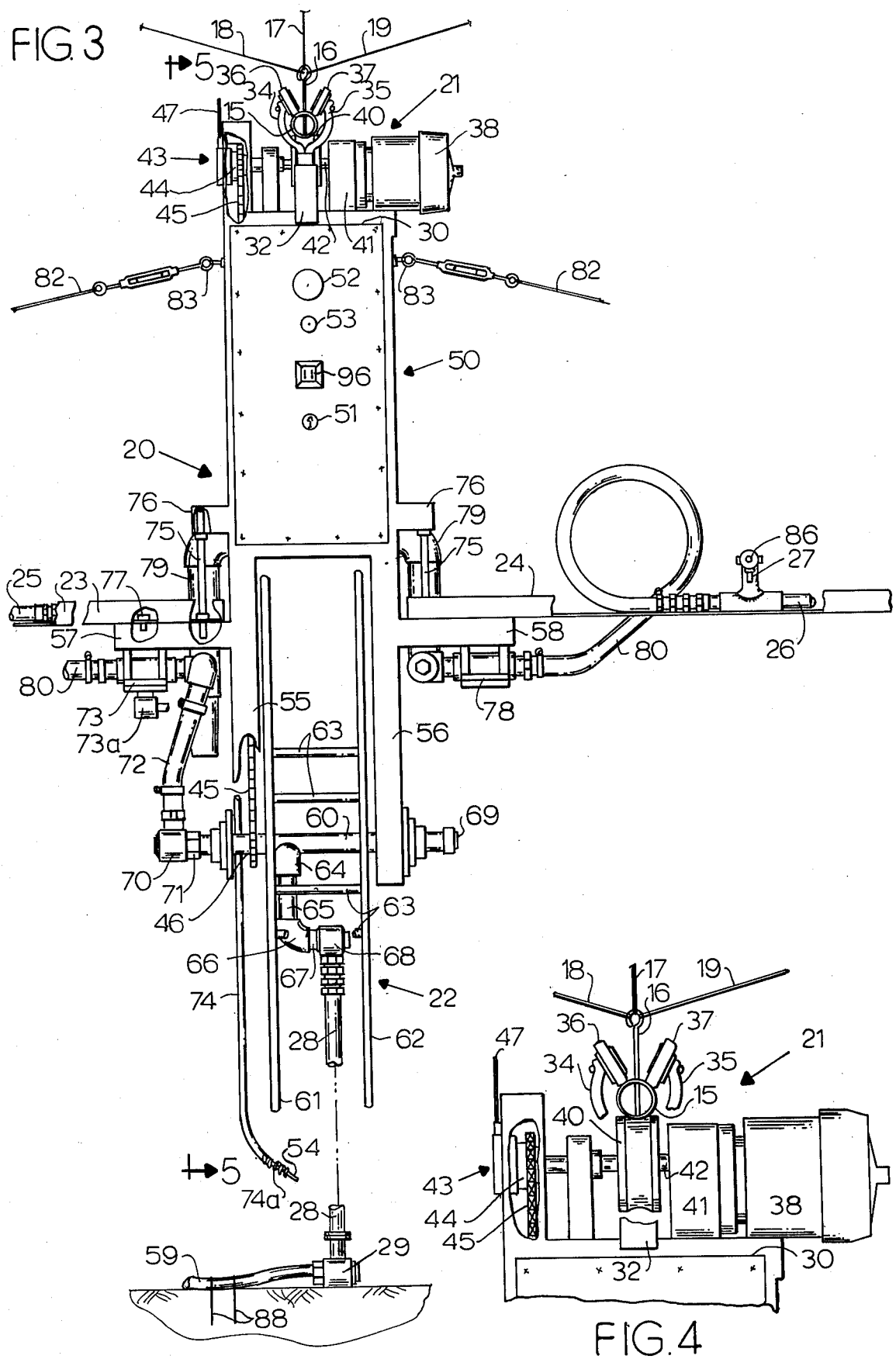

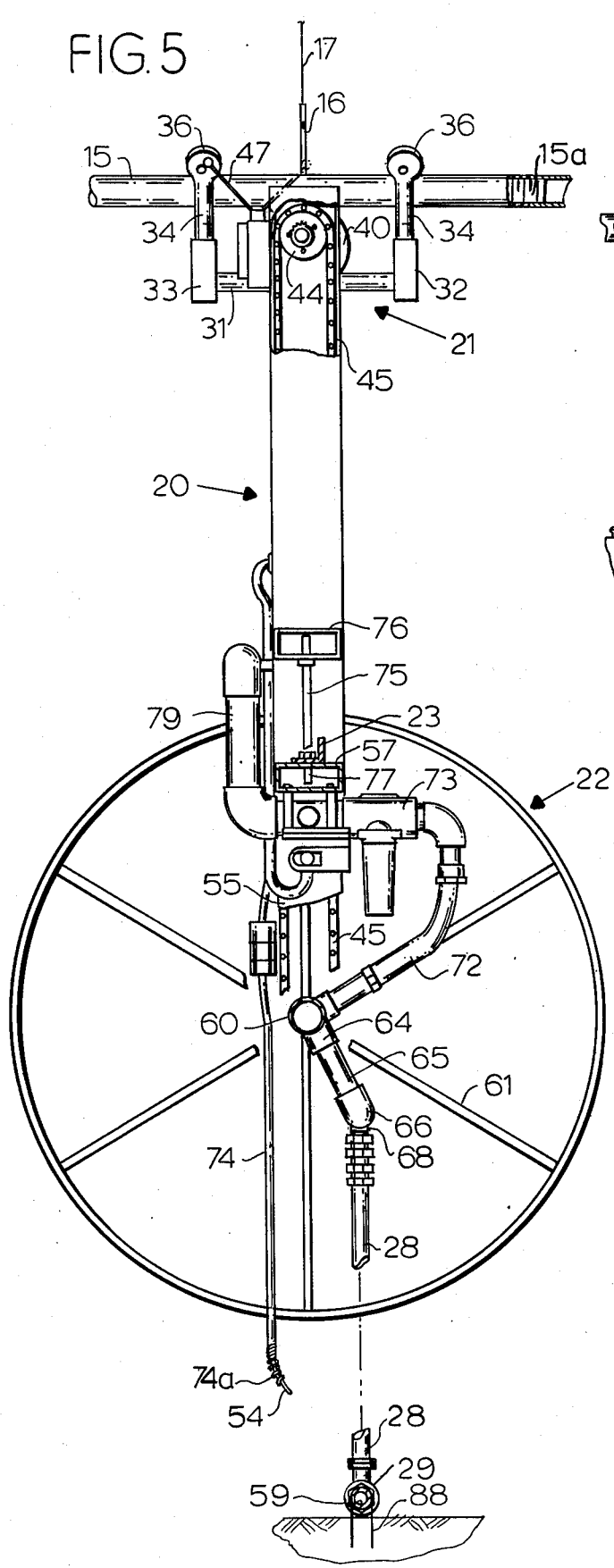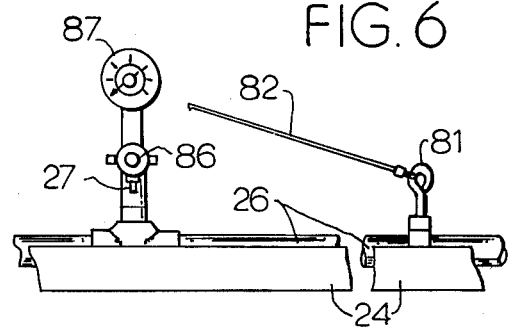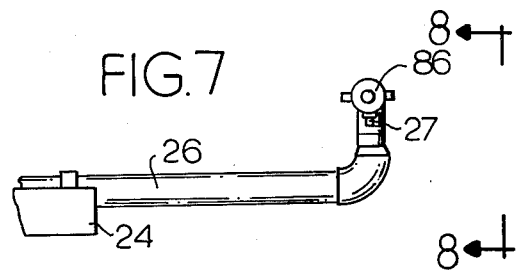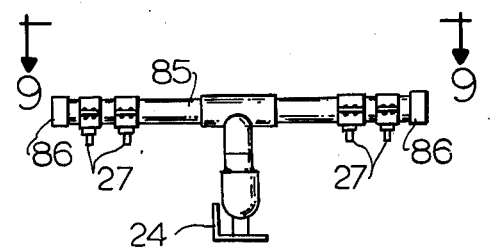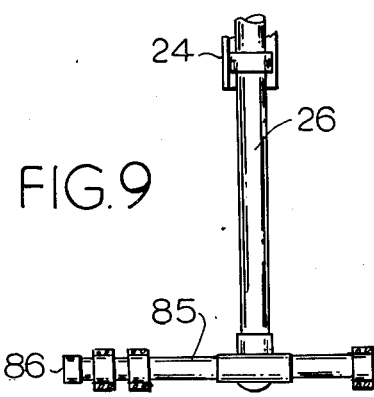

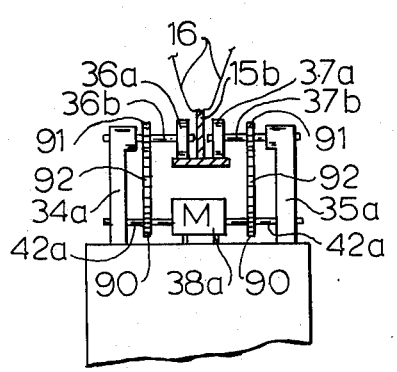
FIG.10
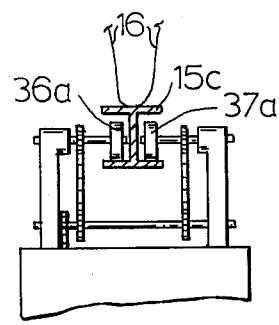
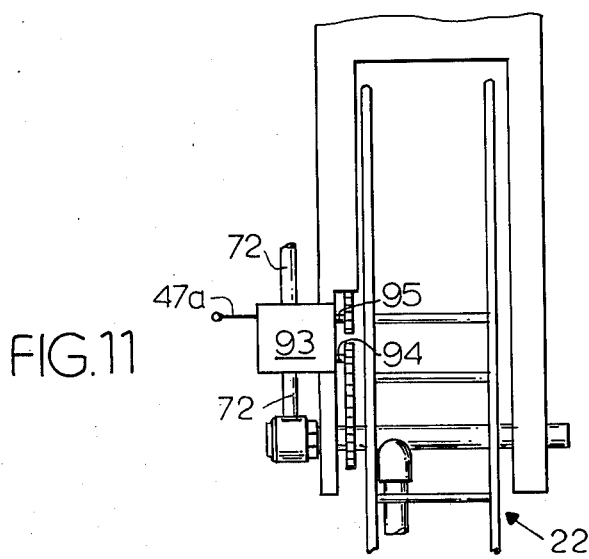
FIG.11
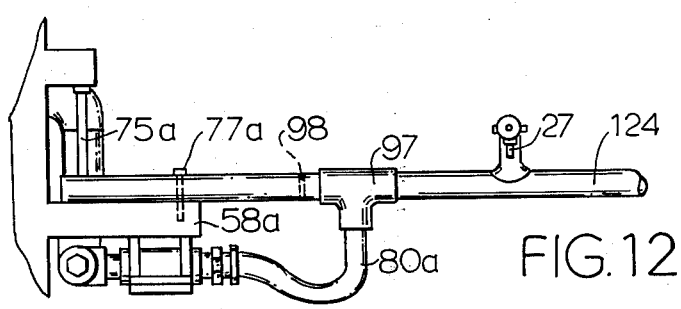
FIG.12
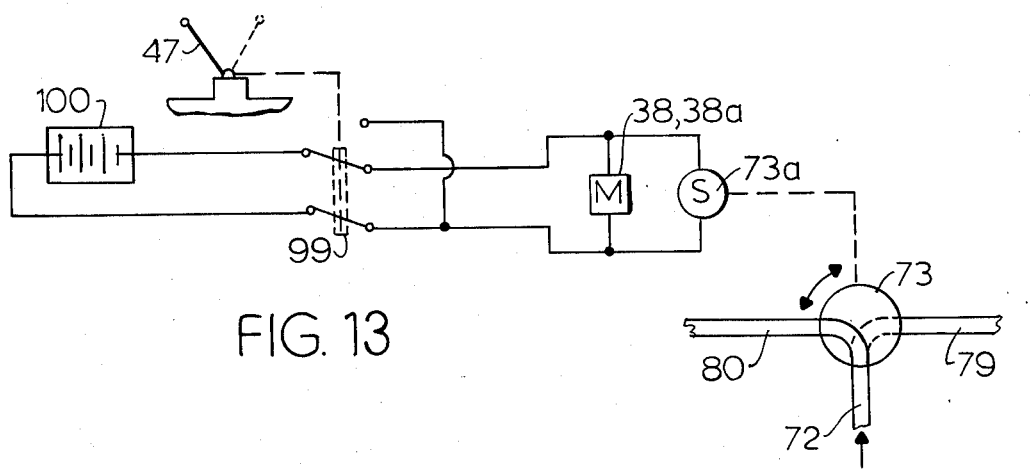
FIG. 13

GREENHOUSE WATERING APPARATUS

BACKGROUND OF THE INVENTION

This invention relates to a watering device for use in greenhouses and in similar environments.

Uniformity of watering is quite important in intensive cultivation of small plants grown on close spacing, such as is the common practice in greenhouses. Uniformity of watering is particularly important when the watering system is also used to apply fertilizer, as is often done. The present invention relates to a greenhouse watering device in which uniformity of watering, with or without fertilizer, is achieved.

Static arrays of nozzles, in addition to interfering with cultivation, have been unable to distribute water uniformly in two dimensions. A fairly uniform distribution along a straight line can be achieved with linearly arranged sets of nozzles, but in order to provide uniform water distribution over an area, the linear set of nozzles must be moved transversely over the area. Thus, several types of movable irrigators have come into use. Unfortunately, each of these prior-art movable irrigators has significant disadvantages.

In one major type of movable irrigator, a row of nozzles is arranged along a horizontal boom, which extends across the full width of a greenhouse and is fastened in the middle to a carriage or cart which runs on rails or on a concrete walk. The rails or the walk take up a significant amount of valuable ground space in the greenhouse, which could otherwise be used for growing plants: considering the costs of building and maintaining greenhouses, this loss of growing space is an important disadvantage to this type of movable irrigator.

Another movable irrigator eliminates this disadvantage by having the carriage or cart travel along an overhead track. However, in this form of movable irrigator, a large and heavy track is necessary to support the horizontal boom and the water in it, and a substantial overhead structure in the greenhouse is required to support it and make it sufficiently rigid. Furthermore, the cart tends to become twisted in the tracks and to jam. A still further disadvantage is that a massive overhead structure tends to shade the plants growing beneath it, and when the watering device is not in use, the amount of shadow cast can be quite significant.

Another approach has been to support the horizontal nozzle-carrying boom at each end. However, end support requires a very heavy construction for the boom, since its unsupported length is then twice that of a boom supported in the middle. Furthermore, since greenhouse roofs are normally gabled or arched and are therefore higher in the middle, support cables can be run from the ends of a center-supported boom to the higher center structure of the greenhouse roof, while trussing cables for an end-supported boom would have to extend below the boom, absorbing needed space and putting the cables in the path of the water flow. An additional problem with this system is that track space must be provided along both side walls of the greenhouse. Even though such tracks are above ground level and even though plants would theoretically be grown directly under the tracks, in actual fact, this is seldom possible, because cultivating is done with a tractor, and the tires of the tractor must clear the supports. As a result, the growing space in the greenhouse is substantially reduced. End-supported irrigator booms have the further disadvantage that they tend to twist or oscillate as they advance unless both ends are driven, and it is more expensive to drive both ends.

A problem common to substantially all of these movable irrigators is that the water supply hoses are commonly dragged along the ground or else festooned in large loops. Dragging causes excessive wear and also has the disadvantage of taking up a space three or four feet wide for the loop of hose. Here again, the growing space is substantially reduced. Festooning is a complicated solution, requiring a traveling hanger for each loop of hose suspended and, of course, more hose is required with festooning than in the other systems, because the hose can never be fully stretched out, and it must travel the complete length of the greenhouse unless complicated switching is used at the center of the house. In methods where festooning is not required, the hose can extend each way from the center of the greenhouse. Further, the length added by festooning carries a disproportionate penalty, since the hose must be made larger in diameter to keep water friction losses reasonable. Consequently the weight of the water plus the hose that must be supported when the boom is near the supply end is considerable. Also, the space absorbed by the festooned hose is quite large.

Another method of supplying water to booms does away with the hose and provides an open trough into which an elephant snout of the traveling boom reaches to pick up water. In this type of device, a pump on the boom creates the water pressure to supply the nozzles. However, such a trough is much more costly to provide than an equivalent length of hose, and this method includes the further expenses of the pump, a pressure regulator, and so on, which can be a considerable amount. Besides that, the open trough takes up about a foot of growing room from the width of the greenhouse.

An object of the present invention is to solve the foregoing problems and to do so in a relatively inexpensive and a completely reliable manner. It is an object of the invention to provide an irrigating boom which is light in weight, easy to install, and easily operated by an unskilled laborer.

Another object is to provide an irrigating boom which does not require special parts or structures.

Another object is to take up as little growing space as possible and to thereby enable cultivation of substantially the complete extent of the greenhouse.

Another object is to provide a device that shades the growing plants as little as possible and also interferes as little as possible with cultivation by tractor.

A further object that must not be overlooked is the achievement of even distribution of irrigation water within a greenhouse.

SUMMARY OF THE INVENTION

The greenhouse watering apparatus of this invention includes a horizontally and longitudinally disposed support member, which may be a straight cylindrical pipe, suspended from the top only, as from the roof of the greenhouse. A carriage has a yoke at its upper end with trolley wheels mounted to roll on two opposite upper surface portions of the support member. The wheels roll along paths located on opposite sides of the suspension means for the support member, so that the suspension does not interfere with back-and-fourth travel of the carriage. Drive means such as an electric motor is supported by the carriage for rotating a drive wheel in engagement with the bottom of the support member to provide carriage travel in both directions along the support member.

A hose reel is rotatably mounted on the carriage, and it has a central pipe with an inlet fitting to which a liquid-supplying hose is secured. The other end of the hose is connected to a liquid supply by means of a rotary coupling near the center of the greenhouse. The hose and reel are so operated that the hose is maximally reeled when the carriage is positioned centrally between the ends of the support member, adjacent to the liquid supply, and the hose is minimally reeled when the carriage is at either end. A power transmission means connects the reel to the carriage drive motor, preferably through a slip clutch, so that a constant tension is applied tending to reel up the hose. The hose is reeled with minimal clutch slippage when the carriage moves from each end toward the center, and unreeled while the clutch slips in reverse as the carriage moves from the center toward either end. When the carriage moves from the center toward either end, the hose is unreeling, and the constant tension serves to prevent the hose reel from over-running and paying out too much hose. When the carriage moves toward the center and the hose is being reeled up, the slipping of the clutch compensates for the varying rotational speed required in order to compensate for the changing diameter of the reeled hose as the hose is reeled up.

A pair of booms are supported by the carriage, one on each side of the reel. Each boom has a series of spray nozzles and carries or acts as a conduit connected to the reel's central pipe in a connection system including a rotating coupler. The booms may be rigidly mounted, or they may be hinged so that they can be folded into a position parallel to the support member when they are not in use. Valves are preferably provided to enable each boom to be used separately from the other, so that one boom sprays one half at the greenhouse while the carriage moves in one direction, and the other boom sprays the other half while the carriage moves in the opposite direction. This serves to prevent overwatering at the ends of the greenhouse.

A simple, commercially available galvanized pipe may be used as the horizontally disposed support member, and it may be hung from the greenhouse framework by vertical or diagonal wires or cables. Such a pipe provides a smooth, uniform surface on which the carriage can travel without any special machining and with no close tolerances being required. The pipe need not be one continuous length; it may be made in sections joined together by internal sleeves, thereby eliminating the bumps that external couplings would make. The suspension cables can be fastened to any suitable structure and can be used to strengthen that structure, if required. Furthermore, all the materials used to support the boom are light in weight, slender in profile, are readily available, and are inexpensive.

Experience with this apparatus has shown very little swaying or twisting, with the boom arms remaining quite level. Movement of the carriage requires very little power, amounting to an insignificant expense, whereas, with larger, heavier prior art devices, power can be quite expensive and heavy wiring required.

The hose itself is laid on the ground and picked off with no dragging and with no requirement of any loops or festooning. The only ground space lost is substantially equal to the width of the hose, which is typically less than two inches.

Other objects and features of the invention will appear from the following description of a preferred embodiment.

DESCRIPTION OF THE DRAWINGS

In the drawings:

FIG. 3 is an enlarged, more representational view in elevation and in section of the device of FIGS. 1 and 2. The support cables and the ends of the booms are broken off in order to conserve space.

FIG. 4 is an enlarged view of an upper portion of the device.

FIG. 5 is a side view in section taken along the line 5—5 in FIG. 3.

FIG. 6 is a fragmentary view in elevation of a portion of one boom.

FIG. 7 is a view in elevation of the end portions of the same boom.

FIG. 8 is a side view, taken along the line 8—8 in FIG. 7.

FIG. 9 is a fragmentary plan view of the same boom end portion, taken along the line 9—9 in FIG. 8.

FIG. 10 is a fragmentary view in section, similar to the upper portion of FIG. 3, of a modified form of invention employing an inverted T-beam in place of a pipe as the horizontal support for the carriage, with the suspension rollers being driven.

FIG. 11 is a fragmentary view partly in section similar to FIG. 10 showing a wide flange beam (like an I-beam) in place of the T-beam and showing the use of a water motor for driving the carriage.

FIG. 12 is a fragmentary view of a portion of a modified form of device utilizing a metal pipe as a boom.

FIG. 13 is an electrical circuit diagram for a system in which one boom at a time sprays, with switch actuation of each end of a greenhouse simultaneously reversing the motor driving the carriage and switching the liquid flow from one boom to the other.

DESCRIPTION OF THE PREFERRED EMBODIMENTS

Overall aspects of the invention: (FIGS. 1 and 2)

Figure 1:
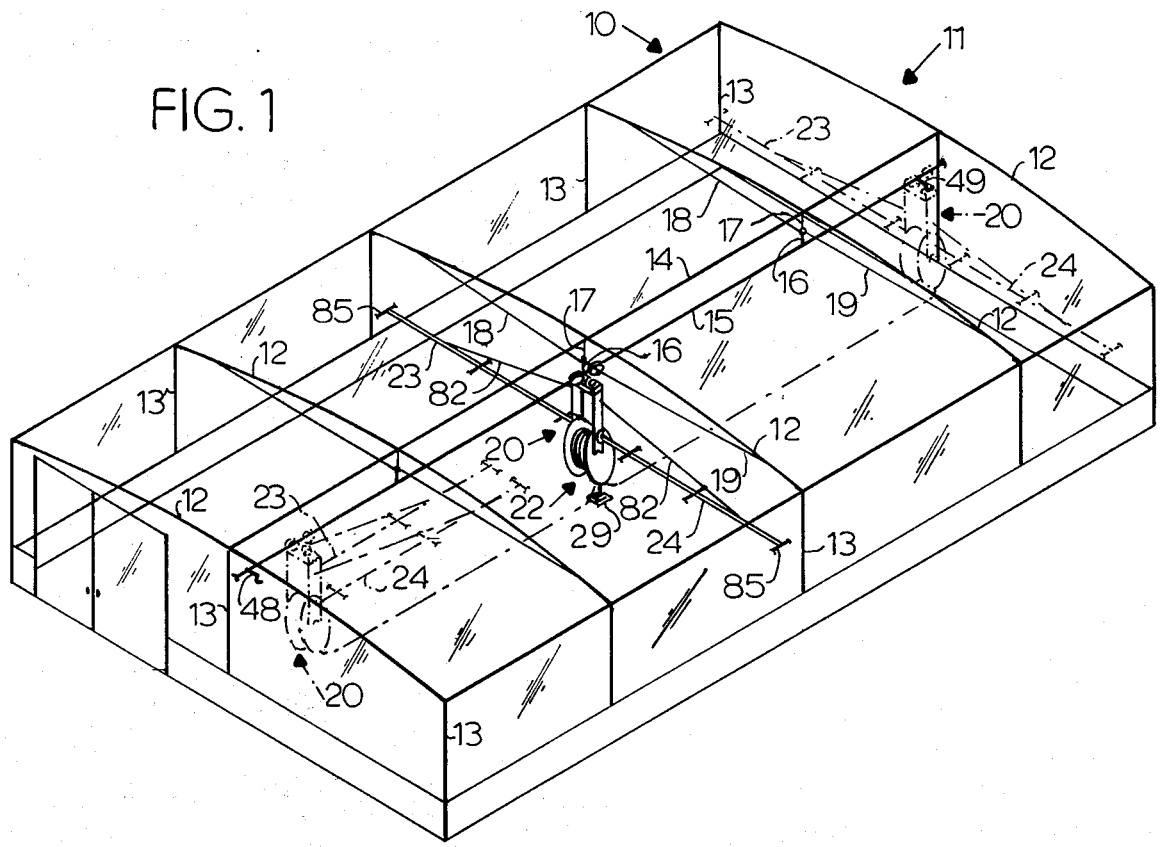
FIG. 1 is an isometric schematic view of a greenhouse in which a watering system embodying the principles of the invention is installed. For simplicity, the members inside the greenhouse are shown generally in solid lines, except for alternative positions of the carriage and booms shown at each end of the greenhouse, and it will be noted that the booms at one end have been shown in a folded position, to present minimum interference to cultivation with a tractor. The unreeled path of the hose is shown in broken lines.
Figure 2:
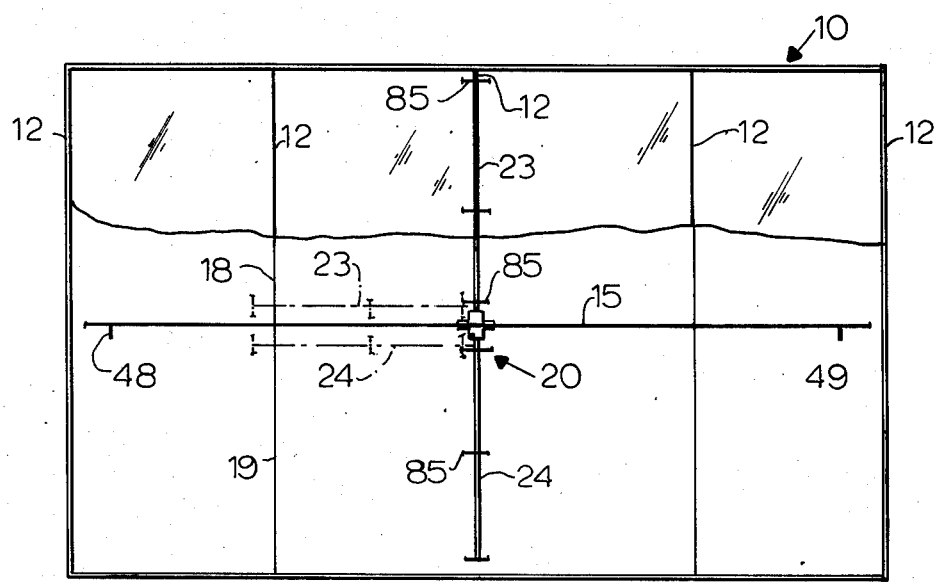
FIG. 2 is a top plan schematic view of the greenhouse of FIG. 1, with the roof of the greenhouse partly removed to show the watering device in its central position midway between the ends of the greenhouse. The folded position of the boom is shown in broken lines.

Although FIGS. 1 and 2 are too small to show the device in detail, they do give an idea how it is used, and a brief description of these views will enable one to understand the subsequent figures better.

The isometric view of FIG. 1 and the plan view of FIG. 2 both represent a greenhouse 10 with one looking from above and through the roof. The greenhouse 10 is rectangular in cross section and has an arched roof 11. The roof is supported by suitable arches 12 which rest on frame members 13 at each end. These arches 12 may be trussed and may be wood or metal. The structure need not be very heavy, and the roof 11 may well be polyethylene or other suitable plastic, although even glass is not so heavy as to require a very strong frame. A central beam 14 runs the length of the greenhouse 10 connecting the tops of the arches 12. Although the preferred embodiments are described in connection with a greenhouse, where the invention would usually be installed, any structure having overhead structural supports and a cultivation area below can advantageously include the apparatus of the invention.

A horizontal support member 15 for the watering system of this invention lies somewhat below the beam 14 and parallel to it, extending from one end to the other of the greenhouse 10. It is supported by hangers 16 to which are attached, as at a hooked end, a plurality of cables (see FIG. 3), including a series of vertical cables 17, each of which is secured to the beam 14, and two angularly extending cables 18 and 19 that are secured to the arch or to the frame members 13 at suitable locations. If desired, only vertical cables or other vertical members can be used, or only angularly extending cables or other angularly extending members can be used. As already stated, the central support member 15 may simply be commercially available galvanized pipe joined together by internal nipples 15a (see FIG. 5) to eliminate the bumps that external couplings would cause; hence, for simplification and illustrative purposes it will hereinafter generally be referred to as the pipe 15.

However, the central support member may comprise an I-beam, an inverted T-beam as illustrated in FIG. 10, or a wide flange beam as illustrated in FIG. 11. In FIG. 10 a T-beam 15b is shown supported horizontally with the web vertical and the flange horizontal, the flange being oriented downwardly. The upper surfaces of the flange provide a pair of roller pathways, and the suspension of the beam 15b, which may be by hangers 16, does not interfere with the pathways. FIG. 11 shows the use of a wide flange beam 15c, with the same results. FIGS. 10 and 11 will be further discussed below in connection with alternative embodiments of other features of the invention.

From the pipe 15 a carriage 20 is suspended by means of a suitable trolley drive assembly 21 (See also FIGS. 3 and 5).

The hanger 16 may be threaded into the pipe 15 and extends out from it only along the top center line of the pipe 15, so that there will be no conflict with the movement of the carriage 20 along the pipe 15. The carriage 20 carries a hose reel 22 and two booms 23 and 24, one secured to each side of the cariage 20. Each boom 23, 24 may support a lightweight (e.g., plastic) pipe 25, 26 (See FIGS. 3 and 5-9) each having a plurality of sprinklers 27 located along its length. Alternatively, as shown in FIG. 12, the booms (only the boom 24 being illustrated) may themselves comprise pipes 124 supporting the sprinklers 27. In either event, a hose 28 supported by the hose reel 22 has one end attached to a rotary coupler 29 (See FIG. 3) on the ground and is preferably reeled maximally around the reel 22 when the carriage 20 is in its central position shown in FIGS. 1 and 2 in solid lines, and is unreeled as the carriage 20 moves toward either end of the greenhouse 10, as indicated by the broken lines in FIG. 1. Of course, the water source and the coupler 29 may be located anywhere along the center of the greenhouse, between its ends. The midpoint location is simply the most efficient in terms of length of hose required.

THE CARRIAGE 20; THE TROLLEY DRIVE ASSEMBLY 21 (FIGS. 3-5):

The carriage 20 is light in weight and is slender to avoid casting an extensive shadow. At its upper end 30 is the trolley drive assembly 21. The trolley drive assembly 21 includes a horizontal support rod 31, which is secured at its center to the frame of the carriage 20 and extends out from it in both directions parallel to the pipe 15 and directly below it. At its two outboard ends, the rod 31 supports two vertical columns 32 and 33, each having at its upper end a pair of curved members 34 and 35, which taken together, comprise a yoke.

Each of the four yoke members 34, 35 has a roller 36, 37 on its upper end supported at an angle to the vertical and engaging the pipe 15 at a location to one side of its upper center, in order not to interfere with the upwardly extending hangers 16. Thus, the four rollers 36, 37 constitute a rolling suspension device supporting the carriage from the pipe 15 so that the carriage 20 can be driven back and forth along the pipe 15. Typically, the rollers 36 and 37 are not driven but simply rotate freely, although, if desired, they may be driven.

The actual drive comes from an electric motor 38 which, preferably, rotates a drive wheel 40 that is kept in snug frictional engagement with the bottom surface of the pipe 15. The drive wheel 40 may have a resilient covering that enables it to achieve good frictional contact and even affords some indentation without binding. The drive from the motor 38 to the wheel 40 may comprise a reduction gear assembly 41 by which a drive shaft 42 is driven, and the wheel 40 is rigidly mounted on the shaft 42.

The shaft 42 also imparts the drive for the hose reel 22, doing this through a slip clutch 43, which may be a conventional slip clutch mechanism, having an output sprocket wheel 44 engaged by a chain 45. The sprocket wheel 44 may be fastened directly to the slip clutch 43, which may be mounted directly on the drive shaft 42. The lower end of the chain 45 engages a sprocket wheel 46 of a central shaft member 60 for the hose reel 22, as will be described below.

Either the motor 38 itself is reversible or the reduction gear assembly 41 includes a reversal mechanism (not shown). A limit switch is provided for reversing the direction of the drive automatically when the carriage 20 arrives at either end of its travel along the pipe 15. Thus, the limit switch includes a pivoted switch arm 47 which operates a switch mechanism (not shown) and which is itself actuated by engagement with rigid members 48 and 49, one at each end of the pipe 15 (shown in diagrammatic form in FIGS. 1 and 2). These members 48 and 49 may be supported by the pipe 15 or by a suitable frame member of the greenhouse 10.

An example of an alternative type trolley drive assembly is shown in FIGS. 10 and 11. As discussed above, an inverted T-beam 15b or a wide flange beam 15c may serve as the horizontal supply member. Two or four trolley wheels 36a and 37a on horizontal shafts 36b and 37b may be driven by a motor 38a mounted on the carriage, as shown in FIG. 10. The drive may be through shafts 42a extending from the motor, with sprocket wheels 90 on the shafts 42a driving the shafts 36b and 37b by means of sprocket wheels 91 and chains 92. One of the motor shafts 42a may also drive the hose reel below, through appropriate slippage mechanism (not shown), or the hose reel may be independently driven by a water motor (not shown in FIG. 10) connected in the path of water flow. A water motor will itself act as a slippage mechanism for the hose reel.

FIG. 11 shows a trolley drive arrangement similar to that of FIG. 10, but with both the trolley wheels and the hose reel 22 driven by a water motor 93. As indicated, the hose reel 22 and the trolley drive must be served by independent output shafts 94 and 95, since the hose reel must be allowed to slip but the trolley drive should not. Thus the motor 93 may actually comprise two separate water motors for the two output shafts 94 and 95, each being driven by water from the line 72 on its way to the nozzles. A pivoted switch arm 47a controls the direction of rotation of the motor output shaft 95, so that as the carriage reaches either end of the greenhouse, rigid members (not shown) change the position of the switch arm 47a to reverse the direction of travel of the carriage. The direction of drive of the hose reel need not be reversed at the ends of the greenhouse (although it may be), since with the hose entirely paid out, either direction of rotation will take up the hose.

It should be understood that other forms of drive for the carriage 20 may also be employed. For example, the carriage 20 may be pulled back and forth through the greenhouse by cables (not shown) driven by a motor (not shown) at one end of the greenhouse. Support for the carriage would be similar to any of the forms of support discussed above.

As best seen in FIG. 3, below the trolley drive assembly is a housing 50 which houses all the electrical assembly used to control the motor 38, including an on-off switch 51, a timer 52 and a speed control 53. If live power is to be used, a power cord 54 extends down to the ground. However, though preferred, live power need not be used. The housing 50 may contain a rechargeable battery capable of supplying power to the motor 38. For recharging, a plug or socket 96 may be provided on the exterior of the housing 50 to engage a recharging socket or plug (not shown) positioned at one end of the greenhouse in the path of the plug or socket 96. The carriage may be controlled by a delay mechanism or circuit of a well known type (not shown) to remain in engagement with the recharging device for a period, then begin traveling toward the opposite end of the greenhouse.

THE CARRIAGE 20; THE HOSE REEL 22 (FIGS. 3-5)

Below the housing 50 the carriage 20 is provided with a pair of depending arms 55 and 56. Each of these arms 55 and 56 includes a laterally extending flange 57 or 58 which is used to support the boom 23 or 24. Near the lower ends of the members 55 and 56 are provided suitable bearings for supporting the hollow hose reel shaft 60.

The hose reel 22 comprises the hollow shaft 60 and a pair of circular web-like members 61 and 62 with a series of circularly disposed horizontal cross members 63 extending between them, about which the hose 28 is wound in a circular spiral pattern. A fitting 64 connects the interior of the hollow shaft 60 to a short radial pipe 65. This, in turn, leads by an elbow 66 to a short pipe section 67 parallel to the bars 63, and the member 67 terminates in a rotary coupling fitting 68 to which the hose 28 is attached. The hose 28 is connected at its other end, preferably through the rotary coupling 29, to a suitable source of liquid supply which may be a pipe 59 leading to a faucet (not shown), and the faucet itself may be fed not only with water but with liquid fertilizer mixed into the water, if desired.

The shaft 60 is driven by the chain 45, since the sprocket wheel 46 is rigidly secured to the hollow shaft 60. However, the chain 45 itself is driven by the sprocket wheel 44 above, which obtains its power from the shaft 42 via the slip clutch 43. When the carriage 20 is moving from either end of the greenhouse 10 toward the center of the greenhouse, the gear reduction afforded by the reduction gearing 41 and the chain drive assembly is preferably slightly less than is required for reeling in the hose 28 around the members 63 and between the members 61 and 62 of the hose reel 22. Therefore, the clutch, in this preferred embodiment, slips at all times, even at the fastest required rotation of the reel (i.e., when the minimum amount of hose is on the drum). This overrunning feature provides a constant tension for laying the hose evenly and tightly, keeping it in a straight line.

The hose 28 is preferably reeled to the maximum at the center of the greenhouse 10, since the rotary coupler 29 to which the hose 28 is attached is preferably located somewhere close to that center position. When the carriage 20 leaves the center of the greenhouse 10 and moves toward either end, the hose 28 is unreeled and the slip clutch 43 then acts to enable this unreeling despite the continued rotation of the drive shaft 42. The force exerted by securement of a portion of the hose 28 to a fixed position acts through the hose 28 to the shaft 60 to cause clutch slippage. The rotary coupling 29 is firmly anchored, as shown in FIG. 3, to the ground in the greenhouse 10 at this point, as by anchor members 88 around the supply pipe 59 connecting the pipe 59 to the rotary coupling 29. Preferably, the rotary coupling is located centrally, as discussed above, but it may be located at one end of the carriage's path, or at some intermediate point. Central location aids in economy of materials. The reversal of the motor 38 at each end of the greenhouse 10, of course, also acts to reverse the direction of rotation of the hose reel 22 itself, although the reel reversal is not necessary.

An important feature of the invention is that the carriage 20 is so proportioned and suspended that the hose reel members 61 and 62 pass close to the ground level. Thus, the hose 28 is laid gently and easily on the ground. The periphery of the reel lies within only a few inches of the ground. As a result, the laying down of the hose 28 does not require festooning nor does it result in spreading the hose 28 over a wide area. This, taken in connection with the slip clutch 43 which releases only upon pull, assures a substantially straight run of the hose 28 on the ground, and means that a minimum amount of ground space need be devoted to the hose 28. The slender profile of the carriage 20, including the hose reel 22, the housing 50, and the trolley drive assembly 21, means that a minimum amount of space is taken up by the carriage 20, and this is important both in allowing space for cultivators, etc., and in minimizing the shadow effect on the plants.

Water coming from the rotary coupling 29 and through the hose 28 passes through the fittings and pipes 68, 67, 66, 65 and 64, into the hollow pipe 60. All of these members rotate with the pipe 60, so that there is no problem concerning flow of the water into the pipe 60. The pipe 60 is connected at one end to a coupling 70, which comprises a stationary member in which a hose coupling portion 71 freely rotates. This use of a rotatable coupling is an important feature. From the coupling 70 a pipe 72, which may be a flexible plastic pipe, leads to a solenoid operated switching valve assembly 73 including a solenoid 73a, supported from the flange 57. From the switching valve assembly 73 the water is preferably distributed alternately into the pipe 25 or the pipe 26 of the boom 23 or 24 as will be described in the next section.

However, it should first be noted that the small-diameter power cord 54 for supplying power to the motor 38 extends from the carriage 20 and is also laid on the ground, or it may be reeled by a suitable spring-wound ground reel if desired. Preferably, it extends up through a stiff tube 74 having a flexible strain relief device 74a of well-known type on its lower end. The device 74a may comprise a helical wire as shown or a flexible but semi-rigid tube (not shown) extending from the stiff tube 74. Alternatively, the cord 54 may be reeled in substantially the same manner as the hose 28, under tension.

THE BOOM MEMBERS 23 AND 24 AND THEIR ASSOCIATED ELEMENTS: (FIGS. 3 AND 5 THROUGH 9)

The booms 23 and 24 are supported by the flange members 57 and 58. This may be done with the aid of a bolt or pin 75 which projects through a lug 76 on each side of the housing 50 and passes through the boom 23 or 24 into the flange 57 or 58. In addition, the booms 23, 24 may be fixed by another bolt 77 directly to the flange 57 or 58. By removing such extra bolts or pins 77, it is possible to swing the booms 23 and 24 so that they lie parallel to the pipe 15. This is not done during watering and is done only at times when the booms 23, 24 form obstructions to other activities such as cultivation. Normally they project out perpendicular to the vertical plane including the pipe 15. During cultivation with a tractor, the watering device should take up the least space possible, and the booms 23, 24 may then be swung in parallel to each other, so that with the carriage 20 located at one end of the greenhouse 10, cultivation may go on. The carriage 20 may be moved to the opposite end of the greenhouse 10 for completion of cultivation.

For the type of boom-conduit 124 shown in FIG. 12, wherein the boom is itself a hollow pipe for conveying water to the nozzles 27, a pin 75a extends through the pipe 124 and establishes a pivot point for the boom-conduit 124, and a removable bolt 77a extends through the pipe and a flange 58a to fix the boom in place for watering. As indicated, the pipe 124 is in two sections, divided by a tee fitting 97. To the left of the tee fitting, as viewed in FIG. 12, the conduit 124 (or the tee itself) is blocked off by an internal plug 98 (dashed lines) which may be welded, screw fitted, or otherwise fitted in place. The tee connects with a flexible conduit 80a leading through various fittings from the solenoid-operated switching valve assembly 73 discussed above.

As indicated in FIG. 3, the switching valve assembly 73 at one side of the carriage is connected to an opposite-side plumbing assembly 78 which depends from the flange 58, the connection being by means of a conduit 79 made up of a series of pipes and elbows. It would be possible to take water from both ends of the hollow shaft 60, but as a matter of economy and simplicity it is preferred to use the illustrated system in which one end of the pipe 60 is closed by a plug 69, and all the water goes out through the single coupling 70, 71, to be distributed from the switching valve assembly 73 to the plumbing assembly 78 by way of the conduit 79.

The switching valve assembly 73 is connected to the plastic pipe 25 that is supported by the boom 23, and the plumbing assembly 78 is connected to the plastic pipe 26, which is supported by the boom 24. The connection, in both instances, is made by a looped piece of flexible pipe 80, the purpose of which is to enable the pipes 25 and 26 to be swung with the booms 23 and 24 into their folded positions parallel to each other.

One form of circuitry which may be employed in conjunction with the reversal of the carriage and the switching valve assembly 73 is diagrammatically indicated in FIG. 13. The pivoted reversal switch arm 47 is linked mechanically to an electric reversing switch 99 which is effective when its position is changed to reverse the polarity of the current flow from a power supply 100 to the motor 38 or 38a and to the switching valve solenoid 73a. Such a polarity reversal, of course, reverses the motor 38 or 38a, since it is of the type which reverses direction upon reversal of polarity. Similarly, the solenoid 73a is of the type which assumes one position on one polarity and another position on the opposite polarity. As indicated, it is mechanically linked to the switching valve 73 to change the position of the valve between the positions indicated in solid and dashed lines in FIG. 13. In the solid-line position, the valve 73 delivers water from the conduit 72 (which leads from the water hose 28) to the flexible line 80 leading to the boom conduit 25; in the dashed-line position, the valve 73 delivers water from the conduit 72 to the conduit 79 leading ultimately to the boom conduit 26.

As explained above, the reason for switching the flow of water from one boom to the other as the carriage reverses direction is to avoid overwatering at the ends of the greenhouse. This could happen if both boom-conduits were to be active in both directions; end areas just watered would be immediately rewatered. Thus, the inclusion of the switching valve assembly 73 is preferred.

The strength of the booms 23 and 24 themselves in the preferred form shown in FIGS. 3 and 5-9 is sufficient to hold the pipes 25 and 26 even when they are filled with water. These booms may be constructed from aluminum angle or angle iron. The pipes 25 and 26 are preferably of lightweight plastic. Of course, it is possible to use a metal pipe for each boom, serving as the water conduit, but this would add weight and therefore is considered less desirable. Additional support for each boom 23, 24 is preferably provided by an eye bolt 81 (FIG. 6) which is suitably attached, as by threading, to the boom 23 or 24, with a cable 82 running from each eye bolt 81 to an anchorage 83 on the housing 50, as shown in FIG. 3. Each boom 23 and 24 is thus supported not only by the flange 57 or 58 but also by the outboard extending cable 82. Such support is also preferably provided for the boom-conduits of the embodiment of FIG. 12. This achieves, again, lightness and strength at maximum efficiency.

Along each boom 23, 24 at desired intervals, are supported short lengths of crossed pipe sections 85, as indicated in FIGS. 1, 2, 6 and 9. Each of these short lengths of tubing or pipe 85 may be made from polyvinyl chloride or other plastic material, and they may be plugged at each end by plugs 86. Each may carry a plurality of sprinklers 27. As shown in FIG. 8 there may be four sprinklers 27, two on each side of each boom 23, 24 carried by these pipes 85. The sprinklers 27 may be adjusted to give a very even spray by using a plurality of them, whereas a single sprinkler is less reliable in getting a uniform pattern. The pipe sections 85 are spaced apart to thereby provide the desired spacing between a series of sprinklers 27.

A suitable gauge 87 may be located at any desired position along each of the pipes to enable a pressure reading at that point.

The nozzles or sprinklers 27 may deliver more than just water, if desired. For example, they may deliver water mixed with fertilizers and/or insecticides. For this purpose tanks and injections for the added material may be provided on the carriage 20 or on the booms 23 and 24 (not illustrated). Similarly, the water delivered through the nozzles 27 may be for purposes other than irrigation. It may be sprayed in a fine mist for increasing humidity or for cooling the greenhouse space, or both. If desired, multiple series of nozzles having different spray characteristics or carrying different mixtures may be provided, and it may in some cases be desirable to include multiple parallel booms for the multiple series of nozzles.

OPERATION OF THE DEVICE:

The carriage 20 is moved along the pipe 15 by the drive wheel 40, while the four rollers 36, 37 suspend the carriage and roll along freely on the upper surface of the pipe 15. The electric motor 38 may be battery powered instead of being powered through the power cord 74 as discussed above. If desired, the drive wheel 40 and the hose reel 22 could be driven by a water motor, as also discussed above.

The reel 22 is preferably driven by the same motor 38, but through the slip clutch 43 and the chain 45. As the carriage 20 approaches the center of the greenhouse 10 the hose 28 is reeled up. When the center of the greenhouse is reached, the hose 28 is substantially completely reeled. Then, as the carriage 20 passes the supply point, at the center point of its path, the coupling 29 rotates and prevents kinking or pinching of the hose 28, while the clutch 43 retains tension as the hose 28 is pulled off the reel 22. The tension which the clutch 43 applies to the reel 22 prevents it from dereeling too much and assures that the hose will be laid on the ground in substantially a straight line without dragging. This is assured in part by the fact that the hose reel 22 hangs just above the ground.

As the device moves back and forth, water flows from the hose 28 to the pipe 60 and thence, preferably alternately, to the two pipes 25 and 26, from which it is dispensed through the sprinklers 27. At each end of the greenhouse 10, limit stops 48 and 49 shift the limit switch arm 47 to reverse the direction of travel and switch the water flow from one boom pipe to the other, and the carriage 20 automatically moves toward the opposite end. A delay period may be set up at this point to give a slight dwell, or the reversal may be instantaneous, as desired, both of these expedients being well known in other types of reversing motor operations.

For cultivation and other work where the boom arms 23 and 24 would interfere, they may be swung into the position where they are parallel, and the carriage 20 may be moved to avoid interference.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A greenhouse watering apparatus, including in combination:

a horizontally disposed support member, suspension means secured to an upper end portion only of said support member for suspending it from above, as from the roof of a greenhouse, a carriage having yoke means at its upper end with trolley wheels resting on and rolling on two opposite upper surface portions of said support member in such a way that said suspension means does not interfere with back-and-forth movement of said carriage, drive means supported by said carriage for driving said carriage to achieve back-and-forth movement of said carriage along said support member, a hose reel rotatably mounted on said carriage and having a central pipe with an inlet fitting, a hose having one end secured to said inlet fitting and so mounted on said reel as to be maximally reeled when said carriage is located centrally between the ends of said support member and minimally reeled when said carriage is at either said end, said hose having a second, input end, a slip clutch, power transmission means connecting said reel to said drive means through said slip clutch, to keep a substantially constant tension on said hose so that said reel is driven to reel said hose when the carriage moves from either end toward the center and so that said hose unreels in a straight line under tension while the clutch slips as the carriage moves from the center toward either end, a pair of boom-conduit means supported by said carriage, one on each side of said reel in a plane perpendicular to said support member, each boom-conduit means having a liquid conduit connected to said reel's central pipe through a rotating coupling means, and a series of spray nozzles for each said liquid conduit.

2. The apparatus of claim 1 wherein said support member is a straight cylindrical pipe.

3. The apparatus of claim 2 wherein said pipe is made in a plurality of sections joined by internal couplers.

4. The apparatus of claim 1 wherein said suspension means comprises a series of vertical cables and said greenhouse has a series of laterally extending frame members, each said vertical cable being connected vertically to the center point of each said laterally extending frame member, and a pair of laterally extending cables connected to each said vertical cable above said support member and below said center point and each connected laterally to said laterally extending frame member outboard of said center point.

5. The apparatus of claim 1 having automatic reversal switch means on said carriage and switch actuating means at each end of said greenhouse for actuating said reversal switch means to reverse the direction of travel of said carriage automatically.

6. The apparatus of claim 1 wherein said power transmission means includes a drive chain, a drive shaft rotated by said drive means, said slip clutch being mounted on said drive shaft, a first sprocket wheel on said slip clutch engaging said drive chain, and a second sprocket wheel in driving engagement with said central pipe and in engagement with said drive chain.

7. The apparatus of claim 1 wherein each said boom-conduit means is connected to said rotating coupling means via a flexible conduit member, each said boom-conduit means being hinged to said carriage so that it can be swung horizonally about 90° to make each said boom-conduit means and its said liquid conduit at least approximately parallel to said support members.

8. The apparatus of claim 1 wherein each said boom-conduit means comprises a metal angle carrying a plastic pipe serving as said liquid conduit.

9. The apparatus of claim 1 wherein laterally extending cable means extends from an outboard portion of each said boom-conduit means to said carriage for aiding the support of said boom-conduit means.

10. The apparatus of claim 1 having valve means for each said boom-conduit means adjacent to said rotating coupling means.

11. Watering apparatus for greenhouses and other enclosures including in combination:
   a horizontally disposed support member,
   suspension means secured to an upper end portion only of said support member for suspending it from above,
   a carriage having yoke means at its upper end with trolley wheels resting on and rolling on a pair of upper surface portions of said support member on opposite sides of said support means in such a way that said suspension means does not interfere with back-and-forth movement of said carriage,
   drive means for driving said carriage to achieve back-and-forth movement of said carriage along said support member,
   a hose reel rotatably mounted on said carriage and having a central pipe with an inlet fitting,
   a hose having one end secured to said inlet fitting and having a second, input end,
   a pair of booms supported by said carriage, one on each side of said reel in a plane perpendicular to said support member, each boom supporting conduit means connected to said reel's central pipe through a rotating coupling means, and
   at least one spray nozzle for each said boom conduit.

12. The watering apparatus of claim 11 wherein said support member is a straight cylindrical pipe.

13. The watering apparatus of claim 12 wherein said pipe is made in a plurality of sections joined by internal couplers.

14. The watering apparatus of claim 11 wherein said suspension means comprises a series of vertical cables and said greenhouse has a series of laterally extending frame members, each said vertical cable being connected vertically to the center point of each said laterally extending frame member, and a pair of laterally extending cables connected to each said vertical cable above said support member and below said center point and each connected laterally to said laterally extending frame member outboard of said center point.

15. The watering apparatus of claim 11 having automatic reversal switch means on said carriage and switch actuating means at each end of said greenhouse for actuating said reversal switch means to reverse the direction of travel of said carriage automatically.

16. The watering apparatus of claim 11 wherein laterally extending cable means extends from an outboard portion of each said boom to said carriage for aiding the support of said booms.

17. The watering apparatus of claim 11 wherein each said conduit means is connected to said rotating coupling means via a flexible conduit member, each said boom being hinged to said carriage so that it can be swung up to about 90° to make each said boom and its said conduit means at least approximately parallel to said support members.

18. The watering apparatus of claim 11 wherein said suspension means comprises hangers connected to the top of said support member, and said roller means comprises rollers connected to an upwardly-extending yoke of the carriage and positioned to ride on the upper surface of the support member on either side of the hangers.

19. The watering apparatus of claim 18 wherein said support member is cylindrical and the rollers are mounted obliquely on the yoke, so that they contact the surfaces of the support member generally perpendicularly.

20. The watering apparatus of claim 11 wherein said carriage drive means includes a motor mounted on the carriage.

21. Watering apparatus, including in combination:
   a horizontally disposed support member,
   suspension means secured to an upper end portion only of said support member for suspending it from above, as from the roof of a greenhouse,
   a carriage having yoke means at its upper end with trolley wheels resting on and rolling on two opposite upper surface portions of said support member in such a way that said suspension means does not interfere with back-and-forth movement of said carriage,
   drive means supported by said carriage for driving said carriage to achieve back-and-forth movement of said carriage along said support member,
   a hose reel rotatably mounted on said carriage and having a central pipe with an inlet fitting,
   a hose having one end secured to said inlet fitting and so mounted on said reel as to be maximally reeled when said carriage is in one position, minimally reeled when said carriage is in another position, at said hose having a second, input end,
   power transmission means connecting said reel to said drive means through tension-maintaining means for placing substantially constant tension on said hose so that said reel is driven to take up said hose when the carriage moves away from the input end of said hose and so that said hose pays out in a straight line under tension as the carriage moves toward said input end,
   a pair of boom-conduit means supported by said carriage, one of each side of said reel in a plane perpendicular to said support member, each boom-conduit means having a liquid conduit connected to said reel's central pipe through a rotating coupling means, and
   at least one spray nozzle for each said liquid conduit.

22. A watering apparatus for a structure having overhead members, including in combination:
   an elongated horizontal support member extending generally from one end of the structure to the other in an elevated position and serving as a track,
   suspension means secured to the support member for suspending it from the overhead members above,
   a carriage including roller means supporting the carriage for travel along the support member, said suspension means being positioned outside the path of travel of the roller means and the remainder of the carriage, carriage drive means for moving the carriage along the support member, means associated with the drive means for reversing the direction of travel of the carriage when it has reached an end of the support means, a hose reel rotatably mounted on the carriage and having a central pipe with an inlet fitting, a flexible water supply hose having one end connected to the inlet fitting of the reel and another end adapted for connection to a water supply outlet located generally below the path of travel of the carriage, reel drive means constantly and yieldably urging rotation of the reel and takeup of the hose during travel of the carriage, so that the hose is reeled in as the carriage approaches the water supply outlet and unreeled under tension as the carriage moves away from the water supply outlet, a pair of boom means supported by the carriage and extending generally horizontally and perpendicular to the support member, one boom means on either side of the carriage, each said boom means including a conduit connected through a rotary coupling to the central pipe of the reel, and at least one spray nozzle on each boom conduit.

23. The watering apparatus of claim 22 wherein said suspension means comprises hangers connected to the top of the support member, and said roller means comprises rollers connected to an upwardly-extending yoke of the carriage and positioned to ride on an upper surface of the support member on either side of the hangers.

24. The watering apparatus of claim 23 wherein said support member is cylindrical and the rollers are mounted obliquely on the yoke, so that the axis of each roller lies generally parallel to a line tangent to the support member at the point of contact.

25. The watering apparatus of claim 22 wherein said carriage drive means includes a motor mounted on the carriage.

26. The watering apparatus of claim 25 wherein said motor is powered by a battery mounted on the carriage, and the carriage includes battery recharging means for engaging a recharging apparatus at one end of the structure when the carriage reaches that end.

27. The watering apparatus of claim 25 wherein said reel drive means includes a driving connection with said motor.

28. The watering apparatus of claim 27 wherein said driving connection includes a slip clutch.

29. The watering apparatus of claim 22 which further includes switching valve means connected between said rotary coupling and each said conduit for supplying water to only one conduit when the carriage is moving in one direction and to only the other conduit when the carriage is moving in the opposite direction.

30. The watering apparatus of claim 29 wherein said switching valve means includes a solenoid operably connected to said direction of travel reversing means.

31. The watering apparatus of claim 22 wherein said conduits serve as said boom means, each conduit being connected to the carriage at one end, being connected to said rotary coupling at a first location spaced from said one end, and being internally plugged at a second location between said one end and the first connection.

32. The watering apparatus of claim 22 wherein said reel drive means comprises a water motor connected between the rotary coupling and the boom means conduits, in yieldable driving engagement with the hose reel.

33. The watering apparatus of claim 22 which further includes a water motor connected between the rotary coupling and the boom means conduits, said water motor having two independent outputs, one output being drivingly connected to a friction wheel engaging the support member, serving as said carriage drive means, the other output being in yieldable driving engagement with the hose reel and serving as said reel drive means.

34. The watering apparatus of claim 22 wherein said water supply outlet includes rotary coupling means for directing said other end of the connected water supply hose toward the position of the carriage.

35. The watering apparatus of claim 22 wherein said support member is a beam having a central generally vertical web connected to a lower generally horizontal flange, said web being suspended by said suspension means, and wherein said roller means comprises rollers connected to an upwardly-extending yoke of the carriage and positioned to ride on the upper surfaces of the horizontal flange on either side of the vertical web.

36. The watering apparatus of claim 35 wherein said carriage drive means includes a motor mounted on the carriage and in driving engagement with said rollers.

37. A method of watering the growing area of a greenhouse, comprising:

moving a generally linearly arranged series of watering nozzles and an attached suspended nozzle carriage through an elevated and fixed path generally transverse to the line of the nozzles, from one end of the greenhouse to the approximate center of the greenhouse, while reeling onto the carriage, at a level close to the ground, a water supply hose connected to the nozzles and to a water supply located at the approximate center of the greenhouse, while delivering water from the water supply through the hose to the nozzles, and while holding all parts of the carriage above ground except only said hose, continuing the movement of the nozzles and carriage to the other end of the greenhouse while unreeling the hose from the carriage in substantially a straight line as unreeling is required by the position of the carriage, automatically reversing the direction of travel of the nozzles and carriage when said other end of the greenhouse is reached, and repeating the reeling and unreeling steps as the nozzles and carriage move toward said one end of the greenhouse, and automatically reversing the direction of travel when the one end is again reached, thereby providing substantially uniform water distribution over the growing area of the greenhouse without occupying an appreciable portion of the growing area with watering apparatus.

38. The method of claim 37 wherein said hose reeling and unreeling steps include exerting a constant yieldable reeling force on the hose.

39. A method of watering the growing area of a greenhouse, comprising:

moving a generally linearly arranged series of watering nozzles including a left series and a right series, and an attached nozzle carriage through an elevated path generally transverse to the line of the nozzles, from one end of the greenhouse to the approximate center of the greenhouse, while reeling onto the carriage, at a level close to the ground, a water supply hose connected to the nozzles and to a water supply located at the approximate center of the greenhouse, and while delivering water from the water supply through the hose to the left series of nozzles, continuing the movement of the nozzles and carriage to the other end of the greenhouse while unreeling the hose from the carriage in substantially a straight line as unreeling is required by the position of the carriage, and continuing to deliver water to the left series of nozzles, reversing the direction of travel of the nozzles and carriage when said other end of the greenhouse is reached, and discontinuing water delivery to the left series of nozzles, and repeating the reeling and unreeling steps as the nozzles and carriage move toward said one end of the greenhouse, while delivering water from the water supply through the hose to the right series of nozzles, and reversing the direction of travel and discontinuing water delivery to the right series of nozzles when the one end is again reached, thereby providing substantially uniform water distribution over the growing area of the greenhouse without occupying an appreciable portion of the growing area with watering apparatus.

* * * * *